Figure 1:
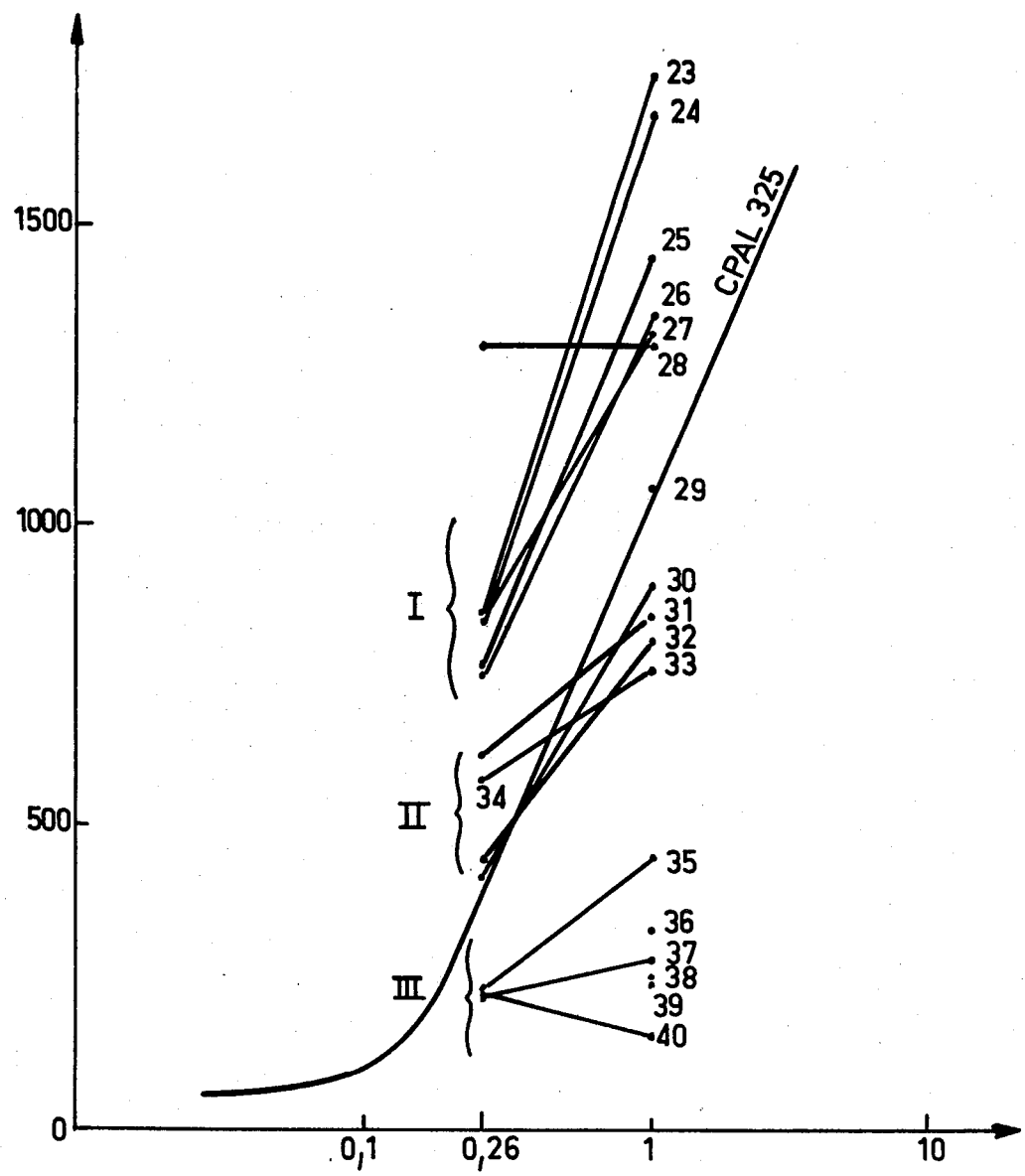

United States Patent [19]

Arnould et al.

[11] 4,137,089
[45] Jan. 30, 1979

[54] PROCESS FOR PRODUCING HYDRAULIC BINDERS AND BINDERS OBTAINED

[75] Inventors: Marcel Arnould, Bourg La Reine; Roger Struillou, Villeron, Yvette; Jack Roger, Chartres, all of France

[73] Assignee: Association pour la Recherche et le Developpment des Methodes et Processus Industriels (A.R.M.I.N.E.S.), Paris, France

[21] Appl. No.: 756,007
[22] Filed: Mar. 18, 1977
[51] Int. Cl.² ............................................. C04B 7/36
[52] U.S. Cl. .................................................. 106/100
[58] Field of Search ............................ 106/89, 100

[56] References Cited
U.S. PATENT DOCUMENTS

| 3,251,701 | 5/1966 | Klein | 106/89 |
| 3,860,433 | 1/1975 | Ost et al. | 106/89 |
| 4,036,657 | 7/1977 | Mehta | 106/89 |

Primary Examiner—James Poer
Attorney, Agent, or Firm—Oblon, Fisher, Spivak, McClelland & Maier

[57] ABSTRACT

A process for producing hydraulic binders comprising essentially calcium and silicon oxides by adding, to a mixture composed of compounds containing oxygen, calcium, silicon, and optionally other elements which are normally encountered in conventional raw materials, particularly aluminium, at least one disturbing agent capable of modifying the crystallinity of the minerals normally formed by the firing of said mixture of compounds at high temperatures, firing said mixture of compounds containing said disturbing agent, and recovering a mineral product possessing hydraulic properties.

15 Claims, 3 Drawing Figures

PROCESS FOR PRODUCING HYDRAULIC BINDERS AND BINDERS OBTAINED

The present invention, which is the result of work done at the Engineering Geology Centre of the Ecole Nationale Superieure des Mines of Paris, relates to a process for producing hydraulic binders, particularly at low temperatures; it also relates to the hydraulic binders produced by this process.

In the present description use will in general be made of the conventional symbols used in the cement industry, that is to say silica ($SiO_2$) will be designated "S", calcium oxide (CaO) will be designated "C", and a aluminium oxide ($Al_2O_3$) will be designated "A", while the designation "$\bar{S}$" will be given to $SO_3$.

It is known that hydraulic binders are products capable of hardening under water. Among the conventional hydraulic binders mention may be made of Portland cement, which is the hydraulic binder most generally used. In the case of Portland cement the hardening is due essentially to the rapid hydration of tricalcium silicate $C_3S$, which imparts considerable mechanical strength to the paste. Dicalcium silicate $C_2S$, which is also present in the Portland cement, however, hydrates only very slowly, that is to say in a matter of months or years; nevertheless, this mineral is also capable of providing the paste with great mechanical strength, but only in the long term. On the other hand, the aluminates in Portland cement, which are generally essentially $C_3A$, hydrate rapidly but impart only low mechanical strength to the paste.

Quick-setting hydraulic cements are also known. In this connection mention may be made of cements which contain at least about 20% by weight of $C_3A_3C\bar{S}$, at least about 10% by weight of chemically unbonded $CaSO_4$, and $C_2S\beta$. Such cements are described in French Pat. No. 73.19 901. The process for producing the cements which is described in French Pat. No. 73.19 901 consists in calcining at a temperature between 1200° and 1600° C., and for a period of about 1 to 5 hours, a mixture of respective sources of CaO, $SiO_2$, $Al_2O_3$, and $SO_3$ is effective proportions of about 1 to 3 moles of $CaSO_4$ to about (0.5 to 2) + 2n moles of $CaCO_3$ per mole of $Al_2O_3 nSiO_2$ (n = about 1.5 to 2.5); the cement obtained in this manner has a compressive strength of at least about 204 kg/cm$^2$ within 24 hours from commencement of hydration.

British Pat. No. 1,067,858 also describes a hydraulic cement; this cement is composed (a) of at least one silicate of the type present in Portland cement and having the properties of a hydraulic cement, and (b) of a stable calcium aluminosulphate in the form of a ternary compound of formula $C_4A_3\bar{S}$; in this cement the component (a) is present in a sufficient amount for the composition to be of the Portland type, and the compound (b) is present in an amount such that in the presence of CaO and $CaSO_4$ it compensates for the shrinkage by drying of the product obtained by mixing the cement with a mineral aggregate and water. This cement is produced at a temperature of the order of 1350° to 1600° C.

Furthermore, in the case of aluminous cements it has been noted that the active mineral is monocalcium aluminate CA, which hydrates rapidly, imparting excellent mechanical strength to the paste.

It is therefore of particular interest to have available cements composed essentially of tricalcium silicate $C_3S$ or monocalcium aluminate CA. These compounds are generally obtained by firing suitable mixtures of compounds containing oxygen, calcium, and silicon, or containing oxygen, calcium, and aluminium, at temperatures between 1400° and 1600° C. for about an hour. The raw materials used for producing these compounds, that is to say the compounds containing oxygen, calcium, silicon, or aluminium, are usually selected from the limestones, clay, schists, and bauxite. In order to obtain a firing temperature of 1400°-1500° C. it is necessary to use a so-called "high temperature" source of energy, for example a source of energy of the fuel oil type; the consumption of energy generally represents from 30 to 60% of the cost price of the hydraulic binder.

It is already known that the clinker formation temperature can be reduced by adding nitrites and nitrates of Ca and of $NH_4$; the reduction of this temperature is however only of the order of from 30° to 40° C. (Ceramic Abstracts vol. 57, No. 7, July 1974 p. 144).

It has now been found that it is possible to obtain hydraulic binders, particularly at low temperatures, which taking into account the present energy situation may constitute a considerable economy and make it possible to use so-called "low temperature" sources of energy.

The present invention therefore has as its object a process for producing, particularly at low temperatures, hydraulic binders composed essentially of oxides of calcium and silicon. It also relates to hydraulic binders produced by this process, these binders having properties similar to or comparable with those of present cements.

The process of the present invention for the production of hydraulic binders composed essentially of oxides of calcium and silicon comprises adding to a mixture composed of the compounds containing oxygen, calcium, silicon, and optionally other elements which are normally found in conventional raw materials, at least one agent capable of modifying the crystallinity of the silicate normally formed by the firing of the said mixture at high temperatures, this agent being referred to hereinbelow as crystal lattice disturbing agent, firing this mixture containing the disturbing agent, and recovering a silicate possessing hydraulic properties.

According to the invention it is possible in particular to effect firing at low temperature, that is to say at temperature below 1000° C. and more particularly temperatures between 600° and 950° C.

More precisely, the process of the invention can thus be utilised with the addition of a disturbing agent and by firing at a temperature above 900° C.

In another embodiment, which is advantageous from the point of view of energy economy, firing is effected at a temperature between 600° and 900° C., in which case there is added to the starting mixture at least one component capable of reacting under the aforesaid temperature conditions with the component of the starting mixture which carries the Ca ion to form a calcium salt which is fusible and decomposable at that temperature.

As previously indicated, the hydraulic binders according to the invention are essentially composed of oxides of calcium and silicon; these are therefore silicates.

The compounds containing oxygen, calcium, and silicon which are used in the process of the invention are selected from the compounds usually employed in the production of conventional hydraulic binders; among these compounds mention may be made of calcium carbonate, silica, silicates, silicoaluminates, and natural or artificial substances containing such compounds, for example the limestones, clays, the various forms of silica, and sands.

It should be noted that in the starting material the silica may be in the free state or in the bonded state. Thus, the invention may be applied to mineral materials such as quartz, cristobalite, tridymite, opal, or silica in the bonded state, such as clays which are alumina silicates.

Similarly, with regard to the sources of calcium, calcium carbonate, which is available in various mineralogical forms, can advantageously be used. This calcium carbonate is substantially pure or in forms in which in addition to calcium other elements such as iron, magnesium, or strontium are contained.

Thus, the mixture composed of compounds containing oxygen, calcium, and silicon may optionally contain other elements which are normally found in conventional raw materials; this mixture may in particular contain aluminium when the compound containing silica is a clay such as bentonite.

The crystal lattice disturbing agents capable of modifying the crystallinity of the silicates normally formed by firing the said mixture at high temperatures are integrated in the crystal lattice which is formed in the course of the firing.

They vary in dependence on the nature of the constituents of this mixture; for example, in cases where the mixture comprising compounds containing oxygen, calcium, and silicon is composed of calcium carbonate and silica in a molar ratio of $CaO : SiO_2$ equal to 2 it has been found that a hydraulic binder is obtained which has different crystallinity from that of pure $C_2S$ (X-ray diffractometry peaks which are less pronounced, wider, and poorly separated) if a sulphate, for example calcium sulphate, is added to the mixture defined above in an amount sufficient to disturb the regularity of the crystal lattice of the $C_2S$, and if this mixture is then fired at low temperature, particularly after adding to the starting mixture a compound capable of reacting with calcium carbonate to form a calcium salt which is fusible and decomposable at the aforesaid low temperature. The compound thus obtained has excellent hydraulic properties. Without wishing to be restricted to any one theory, it is thought that this action takes place as if the $S^{6+}$ ions replaced $Si^{4+}$ ions; study of the X-ray diffraction diagrams of the product thus obtained show in fact that the calcium sulphate peaks appear only after the firing.

The quantity of agent capable of modifying the crystallinity of the mineral normally formed by the firing of the said mixture at high temperatures is very important for the application of the process of the present invention; it depends on the absorption capacity of the crystal lattice which would be formed in the absence of such an agent.

Those skilled in the art will be able to select the disturbing agent to be used in accordance with the invention and to determine its quantity in dependence on the starting products, the properties expected in the final product, and in particular the mechanical strength measured by the crushing of test pieces after hardening at different ages and under different treatment conditions, making sure that all the disturbing agent has completely or practically disappeared in the final product (which can be determined by X-ray diffractometry) at the end of the firing.

By way of indication it will be mentioned that the amount of disturbing agent is generally never greater than 15% by weight in relation to the total weight of the constituents.

As has been previously indicated, the best results are obtained when the mixture of starting components is partially fused and fired at "low temperature", that is to say at least one of the components must have a melting temperature lower than the minimum firing temperature according to the invention; this makes it possible to compensate for the harmful effect of the low temperatures applied on the speeds of reaction, while increasing the distortion of the crystal lattices for the same amount of disturbing agent added. By way of example it will be indicated that it is possible for calcium nitrate to be used advantageously as compound containing calcium; calcium nitrate in fact melts at 561° C. and is decomposed starting from that temperature, forming calcium oxide and nitrous vapours essentially in the form of NO and $NO_2$; at the temperatures at which the process of the invention is applied, for example about 750° C., calcium oxide is thus obtained which is capable of reacting with the compounds containing silicon and/or aluminium.

In a variant of the invention the compound containing calcium used may be calcium carbonate or a substance containing the latter, this carbonate then being initially converted into calcium nitrate either by the action of nitric acid in the cold state or by the action of ammonium nitrate under heat, that is to say at the temperature of the kiln. The reaction which takes place may be indicated in the following manner:

a) Attack by nitric acid in the cold state

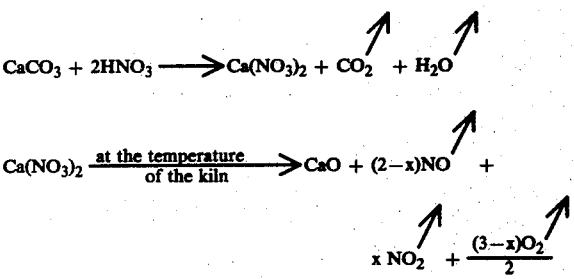

b) Attack by ammonium nitrate

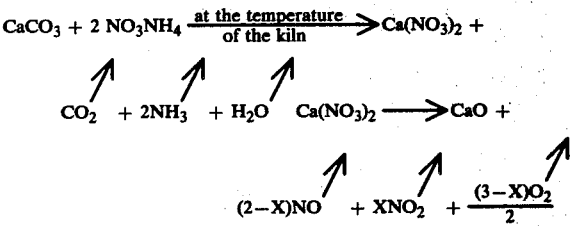

According to another variant of the process of the invention, it is particularly advantageous to operate in the presence of a flux additive; according to the invention any conventional flux additive normally used in the field of cements may be employed; sodium or potassium hydroxide and calcium or sodium chloride may be mentioned as conventional flux additives. The amounts of flux additives to be used are generally of the order of from 0.5 to 5% by weight referred to the final product.

The firing time for the mixture of compounds containing oxygen, calcium, silicon, and optionally other elements which are normally found in conventional raw materials is for example between 20 and 30 minutes for firing temperatures of 750° and 700° C. respectively.

In order to illustrate the invention still further, but without thereby limiting its scope, reference will now be made to the particular mixture of the mineral constituents, calcium carbonate and silica, in which the molar ratio of CaO : $SiO_2$ is about 2, and the characteristics of performance of the process of the invention applied to this mixture will be described in detail.

It is known that the mixture based on calcium carbonate and silica in which the molar ratio of CaO : $SiO_2$ is equal to 2 leads to dicalcium silicate $C_2S$ by firing at a temperature between 900° and 1600° C. Dicalcium silicate $C_2S$ is a hydraulic binder in its beta form, but its speed of hydration is very slow, amounting to months or years.

A binder has now been found which has better hydraulic properties than those of pure $C_2S$ beta by firing at a temperature between 600° C. and 950° C. a mixture of mineral constituents based on CaO and $SiO_2$ such that the molar ratio of CaO : $SiO_2$ is about 2, in the presence of a determined amount of calcium sulphate, at least one of the constituents of the mixture being fusible at the firing temperatures.

For this purpose the procedure was in accordance with one of the modes of operation described previously, that is to say attacking the carbonate component with nitric acid in the cold state or with ammonium nitrate under heat, that is to say at the temperature of the kiln.

It has been found that if an amount of calcium sulphate less than about 6% by weight of the total mixture ($CaCO_3$, $SiO_2$, $CaSO_4$) is used, after firing a product is obtained which has an X-ray diffraction diagram in which the specific lines of calcium sulphate do not appear. On the other hand, if more than 6% by weight of calcium sulphate is used the lines of the latter appear in the X-ray diffraction diagram of the product obtained after firing; the higher the percentage, the more intense these lines will be. By way of comparison, tests were carried out by adding the calcium sulphate after the firing; examination of the X-ray diffraction diagram of the product thus obtained makes it possible to show the presence of calcium sulphate in the product thus obtained. These results as a whole make it appear that the calcium sulphate is integrated in the crystal lattice of the $C_2S$ when the latter is used before the firing and in an amount less than 6% in relation to the total weight of the mixture. The lower limit of the amount of calcium sulphate to be used according to the invention is not critical. Nevertheless, it is advantageous to operate near the maximum absorption of the disturbing agent by the crystal lattice of the hydraulic binder which is to be formed.

It has in addition been noted that the introduction of calcium sulphate into the $C_2S$ under the above conditions brings about a widening of the lines of $C_2S$, a great reduction of their intensity, and the fusion of a number of neighbouring peaks; this shows that the crystal lattice of the $C_2S$ is greatly disturbed by the introduction of calcium sulphate.

On the other hand, the intensity of the $SiO_2$ - CaO reactions does not appear to be weakened by the presence of calcium sulphate, all other operating conditions being identical.

The results obtained with gypsum (hydrated calcium sulphate) are the same as those obtained with anhydrous calcium sulphate; the gypsum in fact is dehydrated at about 163° C.

In the above tests the mixture based on calcium carbonate and silica was composed of lime and quartz.

It has been found that without nitric attack the reaction between the quartz and the lime was very slow. At 950° C. it was practically complete only at the end of about 2 hours in the presence of from 2 to 4% of sodium hydroxide or sodium chloride. With a molar ratio of CaO : $SiO_2$ equal to 2, dicalcium silicate $C_2S$ beta is formed under these conditions. Even if as the result of rapid cooling on leaving the kiln the $C_2S$ beta has not been converted into $C_2S$ gamma, the hardening after hydration imparts to the product obtained in this manner very mediocre mechanical strength during the first few weeks (see Example 1). On the other hand, if about 6% of $CaSO_4$ (Example 4) or 3% of $CaSO_4$ and 3% of $Na_2SO_4$ (Example 2) are added to the starting mixture, the mechanical strengths become interesting after 28 days hardening ($R_c$ = 250 to 300 kg/cm$^2$), but remain very poor after 7 days.

Furthermore, tests have been carried out with quartz and lime in the presence of ammonium nitrate and a flux additive such as NaOH, KOH, NaCl, or $CaCl_2$; it has been found that the reaction was practically complete at the end of the liberation of gas, whatever the temperature between 600° and 800° C.; the peaks of quartz and lime in fact practically disappeared at the end of 45 minutes at 600° C., after 30 minutes at 700° C., or after 20 minutes at 750° C. Below 700° C. non-hydraulic $C_2S$ gamma was obtained even in the case of cold air quenching; above 700° C. $C_2S$ beta, often mixed with $C_2S$ gamma, was obtained, the respective proportions of these two products varying with the nature of the additives and the quenching conditions.

The tests show that when no disturbing agent is used in the process of the invention a binder having excellent hydraulic properties similar to the well known properties of Portland cement is not obtained. Furthermore, when operating under the conditions of the invention without adding a disturbing agent before the firing, but adding calcium sulphate after firing and before homogenisation by grinding, a binder was obtained which hardened slowly and gave only a difficultly measurable mechanical strength after a few weeks.

On the other hand, when the critical conditions of application of the process of the invention are respected, and particularly when a disturbing agent and nitric attack are both employed, a hydraulic binder is obtained which hardens rapidly and has good mechanical strength after a few days, as is shown by the illustrative examples given below (see Examples 9, 11, 13, 15, 16, 20, 23, 24).

The calcium sulphate may be totally or partially replaced by sodium sulphate in the process of the invention (see Example 20).

The conditions of hydration of the binder according to the invention can be modified by utilising conventional setting and hardening additives used in the cement industry; thus it is for example possible to use calcium chloride as setting accelerator or gypsum as setting regulator; the latter must of course not be confused with the disturbing agent used according to the present invention.

By way of new products, the invention also relates to the minerals obtained by the process described above and possessing hydraulic properties.

A particular mineral consists of partially sulphated C$_2$S$\beta$ obtained from calcium carbonate and a siliceous product, which are mixed with calcium sulphate and/or sodium sulphate, in an amount less than 15% by weight referred to the total starting weight.

A mineral compound according to the invention and in particular having hydraulic binder properties corresponds to the formula (a):

$$Si_{1-x}S_xO_4Ca_{2-x} \qquad (a)$$

in which $$0 < x < 0.1$$

Another mineral compound according to the invention which possesses hydraulic properties corresponds to the formula (b):

$$Si_{1-y}S_yO_4Ca_{2(1-y)}Na_{2y} \qquad (b)$$

in which
$$0 < y < 0.2.$$

The invention also includes the products resulting from the combination in any proportions of the compounds corresponding respectively to formulae (a) and (b).

The invention will now be illustrated in greater detail by the following non-limitative examples.

EXAMPLE A

Preparation of modified C$_2$S by the process of the invention.

Starting materials used a. Sources of silicon Ground Fontainebleau sand (granulometry below 40μ); this sand is composed of Dumont silica, which is practically pure quartz (SiO$_2$ = 99%).

Spongolith from Baudres (Indre)

This is a rock which contains cristobalite, tridymite, and opal as preponderant minerals, and quartz, illite, and montmorillonite as accessory minerals; its composition by weight is approximately as follows:
SiO$_2$ = 89.40%; Al$_2$O$_3$ = 4.70%; Fe$_2$O$_3$ = 1.80%;
CaO = 0.36%; K$_2$O = 0.39%; H$_2$O = 3.26%.

Argonne gaize

This rock contains cristobalite, quartz, tridymite, and opal as preponderant minerals, and illite and montmorillonite as accessory minerals; its composition by weight is as follows:
SiO$_2$ = 81.80%; Al$_2$O$_3$ = 7.04%; Fe$_2$O$_3$ = 3.60%;
CaO = 1.71%; K$_2$O = 1.05%; its firing loss is 3.66%.

B. Source of calcium

Meudon white (ground chalk) was used; this limestone contained 99% of CaCO$_3$.

c. Disturbing agents according to the invention Gypsum, calcium sulphate, or sodium sulphate were used.

d. Conventional flux additives NaCl; CaCl$_2$; NaOH; KOH.

The mixture of components based on calcium carbonate and silica was brought into a partly fused state by subjecting the compound based on calcium carbonate to nitric attack by ammonium nitrate in accordance with the mode of operation described previously. The firing times were 30 minutes at 750° C. in the majority of the tests; it will be noted that these times could probably be considerably reduced in practice, because the evacuation of nitrous vapours is complete after 15–20 minutes at that temperature.

The X-ray diffraction spectra of the products obtained according to the invention from mixtures composed of the different starting materials previously mentioned were studied, and the results are given in Tables I to V. In these tables the chemical composition of the crude material has been indicated, that is to say the composition of the starting mixture, utilising the following symbols:

Bent = Bentonite
Sigel = Silica gel
BM = Meudon white
Sp = Baudres spongolith
G = Argonne gaize
Q = Fontainebleau sand
NH = NH$_4$NO$_3$.

The intensities of the specific lines of C$_2$S, CaO, SiO$_2$, and CaSO$_4$ have been indicated by using the conventional symbols F, f, and m.

EXAMPLE B

Study of the hydraulic properties of the products of the invention. The hydraulic properties of the products of the invention were studied by measuring the simple compressive strength of mini-testpieces of paste obtained with the products in question; for this purpose use was made of conventional, that is to say uncompacted mini-testpieces, and also mini-testpieces compacted under pressure and with accelerated setting effected at 40° C. with constant porosity n = 0.30.

Record of tests a. Production of uncompacted mini-testpieces

The binder of the invention was mixed with a spatula with the water to binder ratio E/C of 0.50, in the presence or absence of a setting additive such as CaCl$_2$ or CaSO$_4$.

The paste obtained in this manner was then introduced into a small cylindrical container of plastics material having an inside diameter of 1.25 cm; the only compacting to which this paste was subjected was effected by tapping the bottom of the container several times on the bench so as to obtain a horizontal surface; the container was then stoppered and placed in a desiccator, the bottom of which was filled with water; this enabled it to be cured at substantially constant temperature and relative humidity (the temperature of the laboratory was about 20° C.). After normal curing for 24 hours the tube was filled with water in order to study setting under water. Just before the simple compression crushing the bottom of the container of plastics material was cut on a lathe, and then in the same manner the upper face of the test-piece was trued by cutting it so that the test-piece had a height of about 2 cm. After expulsion from the tube a cylindrical test-piece was obtained which had a height of about 2 cm and a diameter of 1.25 cm, with two parallel faces. According to this technique, which is easy to apply, the exchanges between the test-piece and the external medium are reduced to a minimum during the hardening; the conditions are therefore substantially the same as at the core of a large tube of paste produced by the conventional technique of Laboratoires de Génie Civil (Civil Engineering Laboratories). Strengths were observed after 7 days and after 28 days. It will be noted that for commercial cements the results obtained by this method are comparable with those obtained by the conventional method mentioned above.

Nevertheless, this laboratory method has disadvantages because some bubbles always remain in the paste and because the operation is not carried out with constant porosity. This probably explains the rather considerable dispersion of the results, which is moreover of the same order as that obtained in the crushing of large standardised test-pieces by the previously mentioned conventional method.

b. Compacted mini-testpieces with constant porosity and accelerated setting

The principle of the technique developed by J. A. DALZIEL (Cement Technology, July-August 1971, pages 105-112) was used.

The cylindrical mini-testpieces were produced in a mould by static compression of the dry binder in a press to a previous selected porosity.

A vacuum was then made in a double-inlet desiccator before saturating them with water previously brought to the temperature selected for curing. Hydration was effected under water in a stove at constant temperature.

Crushing strengths were measured after hardening for 0.26 day and 1 day with a constant porosity $n=0.30$ and a curing temperature $T = 40°$ C.

The simple compressive strength tests for the products of the invention were carried out on uncompacted mini-test-pieces or compacted mini-test-pieces produced by the methods of operation mentioned above; the results are shown in Tables I to V.

The simple compressive strengths of compacted mini-test-pieces of the products of the invention were compared with that of the product known under the trade name "CPA 325" (product marketed by LAFARGE) by plotting on a graph the simple compressive strength in dependence on hardening time; this graph is shown in the single accompanying Figure, on which the strength are shown in bars on the ordinate and the hardening times in days on the abscissa; the numerals opposite each curve show the number of the example.

The measurements were made on mini-test-pieces with accelerated setting at a temperature of 40° C. and with a porosity $n=0.30$.

On this graph it is found that of the 18 samples tested six have strengths far greater than those of CPA 325, six have equivalent strengths, and six others are distinctly inferior; among these last six samples only one (Example 37) was obtained from a partially fused mixture, that is to say by nitric attack, but the amount of flux agent (NaCl) was probably too great. The other samples (Examples 35, 36, and 38 to 40) were not subjected to nitric attack, as indicated in Table V.

The above examples show that according to the present invention it is possible to obtain binders having hydraulic properties similar to or even distinctly better than conventional binders, while using low-temperature sources of energy, such as coal dust, radioactive waste, and the like.

It must be clearly understood that the present invention is not limited to the preferred embodiment described above, but that it includes all modifications which appear evident to those versed in the art.

Moreover, it should be observed that if the best results are obtained by the combined effect of nitric attack and a disturbing agent, direct firing above 900° C. in the presence of the disturbing agent (without nitric attack) already gives results which are of interest and easily obtained in practice.

It may be stated that in the case of nitric attack the nitrous and/or ammoniacal vapours can be recovered and recycled by means of the conventional reactions of the nitric acid industry.

It should also be emphasised that the process of the invention constitutes a general means for obtaining mineral products which in particular have hydraulic binder properties.

The invention includes compounds corresponding to a formula similar to formulae (a) and (b) above, in which the partial substitutions of Si and Ca will be due to ions of agents disturbing the crystal lattice other than S and Na.

Thus, the invention covers very generally the mineral compounds which have in particular hydraulic properties and are obtained by the action of an agent disturbing the crystal lattice of any of the mineralogic phases of cements known at the present time, this being achieved with variable reaction temperatures.

In Tables I to IV below the following abbreviations will be used:

$t_o$: slow cooling in ambient air
$t_a$: compressed air quenching
$t_e$: quenching by immersing the crucible in water
FF: very strong; F: strong; m: medium; f: weak
ff: very weak; tr: traces
$R_c$: simple compressive strength
X = test-pieces broken on removal from moulds.
NH = $NH_4NO_3$

TABLE I

Direct firing, without nitric attack, of mixtures of quartz ground to $<40 \mu$ and ground chalk (Meudon white) (uncompacted test-pieces; setting at 20° C.)

| No. | Firing adjuvants added to 1 g of quartz + 3.27 g of chalk | Firing conditions T° C and quenching | Time (minutes) | X-ray mineralogy after firing | Setting and hardening adjuvants with $\frac{E}{C} = 0.5$ | Hardening conditions Medium | Time (days) | $R_c$ ($10^5$ Pa) (kg/cm$^2$) Uncompacted mini-test pieces |
|---|---|---|---|---|---|---|---|---|
|  |  |  |  | FF$\beta C_2$S |  |  | 7 | X |
|  |  |  |  |  |  | Water | 28 | X |
| 1 | 0.05 g NaOH | 950° C $t_o$ | 120 | ff CaO tr quartz | None | air | 7 | X |
|  |  |  |  |  |  |  | 28 | X |
|  |  |  |  |  |  |  | 7 | X |
|  |  |  |  |  | 1,8% CaCl$_2$ | Water | 28 | 95 |
|  |  |  |  |  |  |  | 7 | X |
|  |  |  |  |  |  | air | 28 | X |
|  |  |  |  |  |  |  | 7 | X |
|  |  |  |  |  | 3,3% gypsum | Water | 28 | 130 |
|  |  |  |  |  |  |  | 7 | X |
|  |  |  |  |  |  | air | 28 | 139 |
|  |  |  |  |  |  |  | 7 | 13 |
|  | 0,05g |  |  | FF$\beta C_2$S |  | Water | 28 | 285 |

TABLE I-continued

Direct firing, without nitric attack, of mixtures of quartz ground to <40 μ and ground chalk (Meudon white) (uncompacted test-pieces; setting at 20° C.)

| No. | Firing adjuvants added to 1 g of quartz + 3.27 g of chalk | Firing conditions T° C and quenching | Time (minutes) | X-ray mineralogy after firing | Setting and hardening adjuvants with $\frac{E}{C} = 0.5$ | Hardening conditions Medium | Time (days) | $R_c$ ($10^5$ Pa) (kg/cm²) Uncompacted mini-test pieces |
|---|---|---|---|---|---|---|---|---|
|  | NaOH + 0,15g Na₂SO₄ + | 950° C $t_o$ | 120 | ff CaO tr quartz | None |  | 7 28 | X 234 |
| 2 | 0,15g CaSO₄ |  |  |  | 1,8% | Water | 7 28 | 13 175 |
|  |  |  |  |  | CaCl₂ | air | 7 28 | X 175 |
|  |  |  |  |  | 3,3% | Water | 7 28 | X 252 |
|  |  |  |  |  | gypsum | air | 7 28 | X 262 |
| 3 | 0,28g CaSO₄ | 950° C $t_o$ | 30 | FF CaO F quartz f CaSO₄ ffβC₂S |  |  |  |  |
|  | 0,28g CaSO₄ + |  |  | FFβC₂S |  | Water | 7 28 | 9 277 |
| 4 | 0,05g NaOH | 950° C $t_o$ | 960 | fγC₂S ff CaO tr quartz | none | air | 7 28 | 13 285 |
|  |  |  |  |  | 1,8% CaCl₂ | Water | 7 28 | 13 260 |
|  |  |  |  |  |  | air | 7 28 | 13 285 |
|  |  |  |  |  | 3,3% gypsum | Water | 7 28 | X 252 |
|  |  |  |  |  |  | air | 7 28 | X 285 |

TABLE II

Firing of mixtures of ground quartz and ground chalk in the presence of ammonium nitrate

| Examples No. | Firing adjuvants added to 1 g of quartz + 3.27 g of chalk + 5.5 g NH₄NO₃ | Firing conditions T° C and quenching | Time (minutes) | X-ray mineralogy after firing | Setting adjuvants with $\frac{E}{C} = 0.5$ | Hardening conditions Medium | Time (days) | $R_c$ ($10^5$ Pa) (kg/cm²) Uncompacted mini-test-pieces |
|---|---|---|---|---|---|---|---|---|
| 5 | 0,05 g NaOH | 750 $t_a$ | 30 | FγC₂S mβC₂S ff CaO tr quartz |  |  |  |  |
| 6 | 0,05g NaOH + 0,28g CaSO₄ | 800 $t_a$ | 30 | FβC₂S FγC₂S ff quartz tr CaO | None | Water air | 7 28 7 28 | 34 181 X X |
| 7 | 0,07g CaF₂ + 0,28g CaSO₄ | 800 $t_a$ | 30 | FγC₂S mβC₂S ff quartz ff CaO | None | Water air | 7 28 7 23 | X 17 X X |
| 8 | 0,05g Na₂B₄O₇ + 0,28g CaSO₄ | 800 $t_a$ | 30 | FβC₂S f quartz ff CaSO₄ tr CaO | None | Water air | 7 28 7 28 | X 65 X 95 |
| 9 | 0,15 g Na₂SO₄ + 0.25 g | 800 $t_a$ | 30 | FFβC₂S fγC₂S ff quartz ff CaO | None | air | 7 28 | 61 306 |
| 10 | 0,07 g NaCl + 0,28g CaSO₄ | $t_a$ | 40 | FF FFγC₂S f quartz f CaSO₄ | None | Water air | 7 28 7 28 | 39 X X X |
| 11 | 0,07g NaCl + 0,28g CaSO₄ | 750 $t_a$ | 10 | FβC₂S FγC₂S ff quartz tr CaO | None | Water air | 7 28 7 28 | 130 266 135 295 |
| 12 | 0,28 g CaSO₄ + 0,05 g NaOH | 750 $t_a$ | 30 | FFγC₂S mβC₂S m quartz tr CaO | None | Water air | 7 28 7 28 | ~0 X ~0 70 |

TABLE III

Firing of mixtures of ground quartz and ground chalk in the presence of ammonium nitrate

| Examples No. | Firing adjuvants added to 1 g of quartz + 3.27 g of chalk + 5.5 g of $NH_4NO_3$ | Firing conditions T° C and quenching | Time (minutes) | X-ray mineralogy after firing | Setting and hardening adjuvants with $\frac{E}{C} = 0.5$ | Hardening conditions Medium | Time (days) | $R_c$ ($10^5$ Pa) (kg/cm²) Uncompacted mini-test-pieces |
|---|---|---|---|---|---|---|---|---|
| 13 | 0,28 g $CaSO_4$ +0,05g NaOH | 750 $t_o$ | 30 | FFβ$C_2$S f quartz ff CaO ff $CaSO_4$ | None | Water air | 7 28 7 28 | 118 X 130 329 |
|  |  |  |  |  | 1,8% $CaCl_2$ | Water air | 7 28 7 28 | 130 329 113 313 |
|  |  |  |  |  | 3,3% gypsum | Water air | 7 28 7 28 | 86 243 X 234 |
| 14 | 0,28 g $CaSO_4$ | 750 $t_o$ | 40 | Fγ$C_2$S mβ$C_2$S f quartz tr CaO | None | Water air | 7 28 7 28 | 40 243 X 260 |
|  |  |  |  |  | 1,8% $CaCl_2$ | Water air | 7 28 7 28 | X 191 40 182 |
|  |  |  |  |  | 3,3% gypsum | Water air | 7 28 7 28 | 60 165 60 156 |
|  | 0,28g $CaSO_4$ + KOH | 750 $t_c$ | 30 | Fγ$C_2$S mβ$C_2$S f quartz tr CaO | None | Water air | 7 28 7 28 | 76 213 70 243 |
|  |  |  |  |  | 1,8% $CaCl_2$ | Water air | 7 28 7 28 | 52 194 43 193 |
| 16 | 0,28g $CaSO_4$ + 0,07 g NaCl | 750 $t_c$ | 30 | FFβ$C_2$S ff quartz tr CaO | None | Water air | 7 28 7 28 | 54 295 52 256 |
|  |  |  |  |  | 1,8% $CaCl_2$ | Water air |  | 91 410 78 390 |

TABLE IV

Firing of mixtures of ground quartz and ground chalk in the presence of ammonium nitrate

| Examples No. | Firing adjuvants added to 1 g of quartz + 3.27 g of chalk + 5.5 g of $NH_4NO_3$ | Firing conditions T° C and quenching | Time (minutes) | X-ray mineralogy after firing | Setting and hardening adjuvants with $\frac{E}{C} = 0.5$ | Hardening conditions Medium | Time (days) | $RR_c$ ($10^5$ Pa) (kg/cm²) Uncompacted mini-test-pieces |
|---|---|---|---|---|---|---|---|---|
| 17 | 0,28g $CaSO_4$ + 0,07g NaCl | 750 $t_a$ | 30 | Fγ$C_2$S mβ$C_2$S ff quartz ff $CaSO_4$ tr CaO |  |  |  |  |
| 18 | 0,28g $CaSO_4$ + 0,17 g NaCl | 750 $t_c$ | 30 | Fβ$C_2$S mγ$C_2$S f quartz ff Cao | None | Water air | 7 28 7 28 | X 207 26 262 |
|  |  |  |  |  | 1,8% $CaCl_2$ | Water air | 7 7 | X 26 |
| 19 | 0,28g $CaSO_4$ + 0,15g $Na_2SO_4$ | 750 $t_a$ | 30 | Fβ$C_2$S Fγ$C_2$S f quartz tr CaO | None | Water air | 7 28 7 28 | X 74 X 82 |
| 20 | 0,15g $CaSO_4$ + 0,15 g $Na_2SO_4$ | 750 $t_o$ | 30 | Fγ$C_2$S mβ$C_2$S f quartz tr Cao | None | Water air | 7 28 7 28 | 100 313 134 329 |
|  |  |  |  |  | 1,8 % $CaCl_2$ | Water air | 7 28 7 28 | 118 365 118 365 |
|  |  |  |  |  | 3,3 % gypsum | Water air | 7 28 7 28 | 152 X 152 356 |
|  | 0,15 g | 750 |  | Fβ$C_2$S |  | Water | 7 | X |

TABLE IV-continued
Firing of mixtures of ground quartz and ground chalk in the presence of ammonium nitrate

| Examples No. | Firing adjuvants added to 1 g of quartz + 3.27 g of chalk + 5.5 g of $NH_4NO_3$ | Firing conditions T°C and quenching | Time (minutes) | X-ray mineralogy after firing | Setting and hardening adjuvants with $\frac{E}{C} = 0.5$ | Hardening conditions Medium | Time (days) | $RR_c$ ($10^5$ Pa) (kg/cm$^2$) Uncompacted mini-test-pieces |
|---|---|---|---|---|---|---|---|---|
| 21 | $CaSO_4$ + 0,12g NaCl | $t_c$ | 30 | $m\gamma C_2S$ f quartz ff CaO | None 1,8% $CaCl_2$ | air Water air | 28 28 7 7 28 | 130 208 X X 304 |
| 22 | 0,15 g $CaSO_4$ + 0,08g NaOH | 750 $t_c$ | 30 | $F\gamma C_2S$ $m\beta C_2S$ f quartz tr CaO | None | Water air | 7 28 7 28 | 212 X 158 |

TABLE V.
Recapitulative table of results of simple compression rupture tests on "conventional" mini-test-pieces and accelerated mini-test-pieces of the synthetic hydraulic products tested.

| Ex. | T°C | Firing time | Chemical composition of crude mix (in g) | Result of X-ray diffraction analysis | Synthesis atmosphere | Age (days) | Simple compressive strength tests on mini-test-pieces of "conventional" type (in bars) Mixing with water only | |
|---|---|---|---|---|---|---|---|---|
| | | | | | | | Hardening water | Hardening air |
| 23 | 750 | 30 mn | 1Sp + 2,70 BM 0,25 $CaSO_4$+5,5 NH | F $C_2S$, mCaO, f$SiO_2$, fCaSO$_4$ | nitrous | 7 28 | 95 156 | 74 139 | 91 121 |
| 24 | 750 | 30 mn | 1G + 2,80 BM 0,25 $CaSO_4$ 0,04 NaCl+5,5 NH | F $C_2S$, mCaO,f$SiO_2$, ff $CaSO_4$ | nitrous | 7 28 | 156 230 | 312 295 | 130 — |
| 25 | 750 | 30 mn | 1Sp + 3 BM 0,25 $CaSO_4$ 0,10 $CaCl_2$+5,5 NH | F $C_2S$, m CaO, ff $SiO_2$ | nitrous | 7 28 | 277 499 | 490 451 | 381 473 |
| 26 | 750 | 30 mn | 1G + 2,90 BM 0,25 $CaSO_4$ 0,10 $CaCl_2$+5,5 NH | F $C_2S$, mCaO, f$SiO_2$ | nitrous | 7 28 | 143 174 208 | 169 239 | 187 |
| 27 | 750 | 30 mn | 1Sp + 3 BM 0,25 $CaSO_4$ 0,04 NaCl+5,5NH | | nitrous | 7 28 | 369 468 | 338 468 | 325 416 |
| 28 | 750 | 30 mn | 1Sp + 3 BM 0,25 $CaSO_4$ 0,04 $CaCl_2$+5,5 NH | F $C_2S$, m CaO m $SiO_2$ | nitrous | 7 28 | 477 351 | 303 516 | 230 529 |

| Ex. | Age (days) | Simple compressive strength tests on "conventional" mini-test-pieces (in bars) | | | | Simple compressive strength of accelerated mini-test-pieces (in bars) (T = 40°C, n = 0.30) | |
|---|---|---|---|---|---|---|---|
| | | Mixing with water + 3% $CaCl_2$ | | Mixing with water + 3.3% $CaSO_4$ | | | |
| | | Hardening Water | Hardening Air | Hardening Water | Hardening Air | After 0.26 day | After 1 day | |
| 23 | 7 28 | 330 260 | 208 278 | | | 860 | 1820 | 1735 |
| 24 | 7 28 | 304 226 | 338 356 | 260 338 | 260 321 | 239 260 | 187 — | 165 | 880 | 825 | 1730 | 1690 |
| 25 | 7 28 | 238 620 | 416 551 | 377 408 | 264 585 | 269 451 | 386 468 | 740 | 825 | 1445 | 1545 |
| 26 | 7 28 | 299 331 | 343 312 | 317 304 | 117 187 | 134 187 | 117 234 | 670 | 860 | 1360 | 1385 |
| 27 | 7 28 | 165 468 | 247 347 | 338 373 | 290 464 | 347 512 | 364 447 | 810 | 905 | 1385 | 1300 |
| 28 | 7 28 | 434 542 | 330 442 | 321 442 | 316 477 | 247 460 | 282 529 | 1300 | 1345 | 1290 | 1345 |

| Ex. | T°C | Firing time | Chemical composition of crude mix (in g) | Result of X-ray diffraction analysis | Synthesis atmosphere | Age (days) | Simple compressive strength tests on mini-test-pieces of "conventional type" (in bars) Mixing with water alone | |
|---|---|---|---|---|---|---|---|---|
| | | | | | | | Hardening Water | Hardening Air |
| 29 | 750 | 30 mn | 1Sp + 3 BM 0,25 $CaSO_4$ 0,07 $CaCl_2$+5,5 NH | F $C_2S$, m CaO, ff $SiO_2$ ff $CaSO_4$ | nitrous | 7 28 | 529 | 438 | 312 499 |
| 30 | 750 | 30 mn | 1 G + 2,70 BM 0,20 $CaSO_4$ 0,10 $CaCl_2$ 0,04 NaCl+ 5,5NH | F $C_2S$, mCaO,f $SiO_2$ ff $CaSO_4$ | nitrous | 7 28 | 152 334 | 104 256 | 130 174 |
| 31 | 750 | 30 mn | 1Sp + 2,70 BM 0,25 $CaSO_4$ 0,05 NaCH+5,5 NH | F $C_2S$, f CaO ff $SiO_2$; ff $CaSO_4$ | nitrous | 7 28 | 234 252 | 230 377 | 226 395 |
| 32 | 750 | 30 mn | 1Sp + 3 BM 0,25 $CaSO_4$ | F $C_2S$, f CaO, ff $SiO_2$ | nitrous | 7 28 | 521 | 590 | 330 486 |

TABLE V.-continued

Recapitulative table of results of simple compression rupture tests on "conventional" mini-test-pieces and accelerated mini-test-pieces of the synthetic hydraulic products tested.

| Ex. | T° C | Firing time | Chemical composition of crude mix (in g) | Result of X-ray diffraction analysis | Synthesis atmosphere | | | | |
|---|---|---|---|---|---|---|---|---|---|
| 33 | 750 | 30 mn | 0,07 NaCl+5,5 NH 1 Sp + 3 BM 0,25 CaSO₄ | | nitrous | 7 | 143 | 156 | 169 |
| | | | | | | 28 | 321 | 312 | 330 |
| 34 | 750 | 30 mn | 0,10 NaCl+5,5 NH 2 Bent + 3 BM 0,20 CaSO₄+5,5 NH | F C₂S, fCaO, fCS m C₃A | nitrous | | | | |

| | | Simple compressive strength tests on "Conventional" mini-test-pieces (in bars) | | | | Simple compressive strength of accelerated mini-test-pieces (in bars) (T = 40° C, n = 0.30) | |
|---|---|---|---|---|---|---|---|
| | | Mixing with water + 3% CaCl₂ | | Mixing with water +3.3% CaSO₄ | | | |
| Ex. | Age (days) | Hardening Water | Hardening Air | Hardening Water | Hardening Air | After 0.26 day | After 1 day |
| 29 | 7 | | 520 | | 308 | | 1060 | 1115 |
| | 28 | 503 | 581 | 607 | | 529 | | |
| 30 | 7 | 213 | 230 | 334 | 192 | 182 | 187 | 440 | 400 | 920 | 940 |
| | 28 | 516 | 351 | 382 | 260 | 260 | 351 | | |
| 31 | 7 | 260 | 630 | | | | | 635 | 630 | 845 |
| | 28 | 447 | 373 | | | | | | |
| 32 | 7 | | | 460 | | | 356 | 395 | 495 | | 825 |
| | 28 | 421 | 412 | 564 | 603 | 573 | 377 | | |
| 33 | 7 | 299 | 234 | 191 | 212 | — | 186 | 625 | 540 | 770 | 785 |
| | 28 | 451 | 495 | 464 | 351 | 360 | 390 | | |
| 34 | | | | | | | | 570 | 590 | | |

| Ex. | T° C | Firing time | Chemical composition of crude mix (in g) | Result of X-ray diffraction analysis | Synthesis atmosphere | Age (days) | Simple compressive strength on mini-test-pieces of "conventional type" (in bars) Mixing with water only | |
|---|---|---|---|---|---|---|---|---|
| | | | | | | | Hardening Water | Hardening Air |
| 35 | 1000 | 2 h | 1Sp + 3 BM 0,25 CaSO₄ 0,05 NaOH | FF C₂S, mCaO ff SiO₂ ff CaSO₄ | — | 7 28 | 234 | 30 247 208 |
| 36 | 800 | 3 h | 1Sp + 3 BM 0,25 CaSO₄ 0,10 CaCl₂ | F C₂S, m CaO | H₂O vapour | 7 28 | 30 195 | 30 30 165 175 |
| 37 | 750 | 30 mn | 1Sp + 3 BM 0,25 CaSO₄ 0,28 NaCl + 5,5 NH | FF C₂S, m CaO ff SiO₂ | nitrous | 7 28 | 143 | 13 121 139 |
| 38 | 900 | 2 h | 1Sp + 3 BM 0,20 CaSO₄ 0,10 CaCl₂ | F C₂S, f CaO | H₂O vapour | 7 28 | — 17 | 8 — 35 100 |
| 39 | 900 | 2 h | 1Sp + 3 BM 0,20 CaSO₄ 0,10 NaCl | F C₂S, ff CaO | H₂O vapour | 7 28 | 8 26 | S — 17 45 |
| 40 | 950 | 4 h | 1Siu gel + 3,333BM 0,25 CaSO₄ 0,07 CaCl₂ | FF CaO, F C₂S, ff SiO₂ | — | 7 28 | 145 | 145 — |

| | | Simple compressive strength tests on "conventional" mini-test-pieces (in bars) | | | | Simple compressive strength of accelerated mini-test-pieces (in bars) (T = 40° C, n = 0.30) | |
|---|---|---|---|---|---|---|---|
| | | Mixing with water + 3% CaCl₂ | | Mixing with water + 3.3% CaSO₄ | | | |
| Ex. | Age (days) | Hardening Water | Hardening Air | Hardening Water | Hardening Air | After 0.26 day | After 1 day |
| 35 | 7 | | 39 | | 65 | 330 | 145 | 465 | 460 |
| | 28 | 364 | 286 | 303 | 269 | 260 | | |
| 36 | 7 | 70 | 70 | 60 | | | | 375 | 295 |
| | 28 | 460 | 505 | 500 | | | | |
| 37 | 7 | | | 26 | | | 35 | 215 | | 290 | 295 |
| | 28 | 186 | 186 | 191 | 191 | 191 | 178 | | |
| 38 | 7 | — | — | 8 | | | | 240 | 260 |
| | 28 | 45 | 35 | 50 | | | | |
| 39 | 7 | 13 | 13 | 17 | | | | 175 | 310 |
| | 28 | 280 | 285 | 320 | | | | |
| 40 | 7 | | | | | | | 220 | 110 | 190 |
| | 28 | — | 435 | 580 | | | | |

EXAMPLE C

In this example a hydraulic binder according to the invention was prepared. The nature and the proportion of the starting components used are indicated in Table VI below. The mixture of starting components was fired for 30 minutes at 750° C.

The X-ray diffractogram of the binder obtained in this manner was then studied and compared with that of the product (comparison product) obtaining by heating at 1000° C. for 2 hours the mixture composed of spongolith (1 g), Meudon white (2,7 g) ammonium nitrate (4.32 g), and CaCl₂ (0.11 g).

Figure 2:
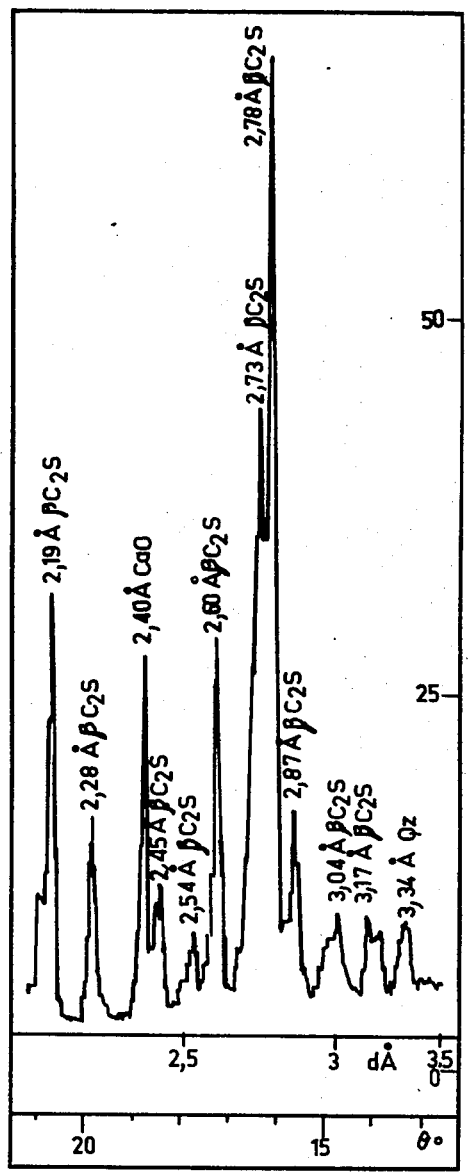
Figure 3:
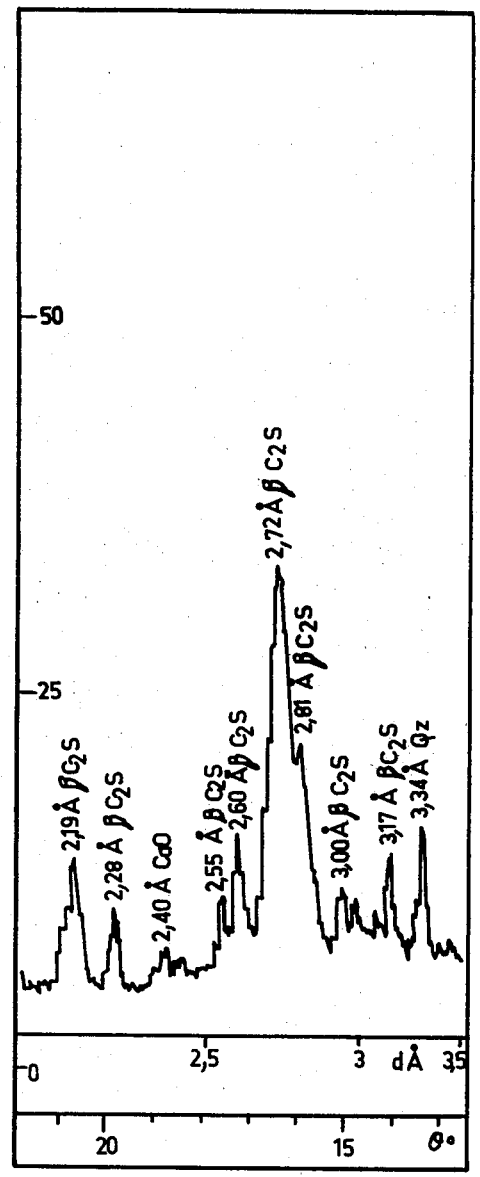

The diffractograms of the above products were obtained with an apparatus having the following characteristics:

Copper anticathode tube: line $K\alpha\lambda = 1.5405$ Å
Generator: 40 kV, 25 mA,
Sensitivity: $10^3$, scale 50=500 strokes per second The accompanying FIGS. 2 and 3 show the diffractograms obtained; FIG. 2 is the diffractogram of the comparison product, which shows the characteristic lines of crystallised βC₂S, and FIG. 3 is the diffractogram of the binder obtained according to the invention; this is sulphated βC₂S whose crystallinity has been modified. It should be noted that in the X-ray diffractogram of the binder of the invention (FIG. 3) the specific lines of calcium sulphate do not occur.

Furthermore, it can be noted that this example illustrates the particular form of application of the process of the invention which makes it possible to work at a relatively low temperature (750° C.), whereas when CaSO₄ is not used the temperature required for obtaining βC₂S is higher (1000° C.).

TABLE VI

| Composition of crude mix used for obtaining the binder of the invention | Composition of crude mix used for obtaining the comparison product |
|---|---|
| 1 g spongolith (SiO₂) | 1 g spongolith (SiO₂) |
| 2.7 g Meudon white (CaCO₃) | 2.7 g Meudon white (CaCO₃) |
| 4.32 g ammonium nitrate (NO₃NH₄) | 4.32 g ammonium nitrate (NO₃NH₄) |
| 0.22 g CaSO₄ | 0.11 g CaCl₂ |

What is claimed is:

1. A process for the production of a hydraulic binder comprising essentially a mixture of calcium and silicon oxides, which process comprises:
adding to a mixture of starting compounds for the preparation of hydraulic binders which starting compounds contain oxygen, calcium and silicon, at least one disturbing agent selected from the group consisting of calcium sulphate and sodium sulphate, said agent being capable of modifying the crystallinity of silicate normally formed by the firing of said mixture of starting compounds at a high temperature, firing said mixture containing said disturbing agent at a temperature between 600° and 950° C., and recovering a silicate possessing hydraulic properties.

2. The process of claim 1, wherein said starting compounds used comprise a substance containing calcium carbonate and a substance containing silica in proportions such that they lead to the formation of C₂S, and wherein said agent disturbing the crystal lattice of said C₂S is at least one of calcium sulphate and sodium sulphate in an amount not exceeding 15% by weight of the total mixture.

3. The process of claim 2 wherein is used calcium carbonate and silica in a molar ratio of CaO content: SiO₂ content of about 2:1.

4. The process of claim 3 wherein firing is effected at a temperature no higher than 900° C.

5. The process of claim 1 wherein the firing is effected at a firing temperature between 600° and 900° C., and wherein is added to said starting mixture at least one component capable of reacting at said firing temperature with a compound of said starting mixture which compound contains calcium, so as to give a calcium salt which is fusible and decomposable at said firing temeprature.

6. The process of claim 4 wherein the amount of disturbing agent used is less than 15% by weight in relation to the total weight of the starting components.

7. The process of claim 5, wherein said starting mixture contains at least one of calcium carbonate and a substance containing calcium carbonate in the free or bonded state, and said calcium carbonate is subjected to nitric attack.

8. The process of claim 7, wherein said nitric attack is effected in the cold state with nitric acid.

9. The process of claim 7, wherein said nitric attack is effected in the course of said firing with ammonium nitrate.

10. The process of claim 1, wherein at least one fluxing agent is used.

11. The process of claim 10, wherein said at least one fluxing agent is selected from sodium hydroxide, potassium hydroxide, calcium chloride and sodium chloride.

12. The process of claim 1, wherein said mixture of starting compounds includes a compound containing aluminium.

13. The hydraulic binder which has the formula:

$$Si_{1-x}S_xO_4Ca_{2-x}$$

wherein $0 < x < 0.1$.

14. The hydraulic binder which has the formula:

$$Si_{1-y}S_yO_4Ca_{2(1-y)}Na_{2y}$$

wherein $0 < y < 0.2$.

15. The hydraulic binder of claim 14 when mixed with a hydraulic binder having the formula:

$$Si_{1-x}S_xO_4Ca_{2-x}$$

wherein $0 < x < 0.1$.

* * * * *